United States Patent [19]

Gahleitner et al.

[11] Patent Number: 5,686,533
[45] Date of Patent: Nov. 11, 1997

[54] POLYPROPYLENES HAVING A REDUCED TENDENCY TO WHITE FRACTURE

[75] Inventors: Markus Gahleitner, Neuhofen; Klaus Bernreitner, Linz; Norbert Hafner, Linz; Kurt Hammerschmid, Linz; Hermann Heinemann, Kematen/Ybbs, all of Austria

[73] Assignee: PCD Polymere Gesellschaft m.b.H., Schwechat-Mannsworth, Austria

[21] Appl. No.: 733,017

[22] Filed: Oct. 16, 1996

[30] Foreign Application Priority Data

Oct. 16, 1995 [AT] Austria .................................. 1709/95

[51] Int. Cl.$^6$ .............................. C08L 23/10; C08L 23/04
[52] U.S. Cl. .............................. 525/240; 525/88; 525/89; 264/331.17
[58] Field of Search .............................. 525/240, 88, 89; 264/328.1, 331.17

[56] References Cited

U.S. PATENT DOCUMENTS

| | | |
|---|---|---|
| 3,634,546 | 1/1972 | Hagemeyer, Jr. et al. ......... 525/240 X |
| 5,397,843 | 3/1995 | Lakshmanan et al. ............ 525/240 |
| 5,409,992 | 4/1995 | Eppert, Jr. ........................... 525/240 X |
| 5,512,649 | 4/1996 | Hendrickson-Benkhoff et al. . |
| 5,519,090 | 5/1996 | Schwager et al. ................ 525/240 |
| 5,521,251 | 5/1996 | Satoh et al. ....................... 525/240 |

*Primary Examiner*—Fred Teskin
*Attorney, Agent, or Firm*—Wenderoth, Lind & Ponack

[57] ABSTRACT

Polypropylenes having a reduced tendency to white fracture, which contain

A) from 70 to 95% by weight of a highly isotactic polypropylene having anisotactic index of more than 90 and a melt flow index between 0.1 and 100 g/10 min, it being possible for the polypropylene to be a homopolymer of propylene or a copolymer of propylene with one or more α-olefins, having a propylene content of at least 50 mol %, and B) from 5 to 30% by weight of a highly amorphous polypropylene having a crystalline polypropylene fraction of up to 10% by weight with an enthalpy of fusion of not more than 40 J/g and a melt flow index between 0.1 and 100 g/10 min, it being possible for the polypropylene to be a homopolymer of propylene or a copolymer of propylene with one or more α-olefins, having a propylene content of at least 80 mol %.

6 Claims, No Drawings

POLYPROPYLENES HAVING A REDUCED TENDENCY TO WHITE FRACTURE

Owing to its many good properties, polypropylene has in recent decades become one of the most widely used plastics and is employed in a large number of fields. Because of the wide application spectrum, the material has to meet constantly increasing requirements, resulting in continuous improvement and extension of the property profile. One of the disadvantages of polypropylene (PP) is the occurrence of white fracture, which manifests itself in an undesired whiteness of the material under deformation load. This effect occurs in many PP types but especially in multiphase systems, such as, for example, in heterophase copolymers with other α-olefins, in particular with ethylene, having improved low-temperature impact strength, and can greatly limit the industrial applicability since the stated whiteness may occur even with relatively small impact loads, such as, for example, stone impact, dropping, etc., or with local strains, such as, for example, bending or flexing, and leads to haze and opacity in substantially transparent components and to unattractive white spots in colored components.

The literature discloses various additives for eliminating or reducing this effect.

Thus, for example, EP-B1-0 273 228 describes a polypropylene composition which contains a styrene-ethylene/butylene-styrene block copolymer or a styrene-ethylene/propylene block copolymer as an additive. Journal of Applied Polymer Science, Vol. 45, pages 317–331 (1992) furthermore discloses the use of ethylene-methacrylic acid copolymers.

However, the disadvantage of the additives known to date is that firstly, owing to the high costs of the additives, they inevitably lead to more expensive products, but secondly are not pure polyolefins. Moreover, such additives result in a change and a deterioration of the mechanical properties.

It was accordingly the object of the present invention to provide an additive for PP polymers which prevents or substantially reduces the tendency to white fracture, the mechanical properties of the material being only slightly adversely affected, if at all, or even being improved in some cases. Furthermore, the addition should not adversely affect the recyclability of the PP material. Unexpectedly, this object could be achieved by the use of highly amorphous and high molecular weight homo- or copolymers of propylene as an additive.

The present invention accordingly relates to polypropylenes having a reduced tendency to white fracture, which contain A) from 70 to 95% by weight of a highly isotactic polypropylene having an isotactic index of more than 90 and a melt flow index between 0.1 and 100 g/10 min, it being possible for the polypropylene to be a homopolymer of propylene or a copolymer of propylene with one or more α-olefins, having a propylene content of at least 50 mol %, and B) from 5 to 30% by weight of a highly amorphous polypropylene having a crystalline polypropylene fraction of up to 10% by weight with an enthalpy of fusion of not more than 40 J/g and a melt flow index between 0.1 and 100 g/10 min, it being possible for the polypropylene to be a homopolymer of propylene or a copolymer of propylene with one or more α-olefins, having a propylene content of at least 80 mol %.

The polypropylenes according to the invention and having a reduced tendency to white fracture consist of a highly isotactic polypropylene A and a highly amorphous polypropylene B as a modifier. The base polymers A are both polypropylene (PP) homopolymers and polypropylene copolymers with one or more α-olefins.

Suitable PP homopolymers are all known highly isotactic PP homopolymers having an isotactic index of more than 90. The homopolymers used preferably have an isotactic index (as defined in EP 255 693 or Macromolecules 6 (6) 925–26 (1973)) of more than 95. The melt flow index (MFI) of the polypropylenes used is between 0.1 and 100 g/10 min according to ISO 1133/DIN 53735, measured at 230° C. and 2.16 kg. Polypropylenes having an MFI between 0.5 and 50 g/10 min are preferably used.

PP copolymers are copolymers of propylene with one or more α-olefins. The α-olefins suitable as comonomers are olefins having 2 to 10 C atoms, such as, for example, ethylene, butene, hexene or decene. Ethylene is preferably used as a comonomer. The amount of propylene in the corresponding copolymers is at least 50 mol %, preferably at least 70 mol %. The copolymers may be both random copolymers and heterophase copolymers.

The isotactic index of the copolymers should once again be more than 90, preferably more than 95, and the MFI index between 0.1 and 100 g/10 min, preferably between 0.5 and 50 g/10 min.

Suitable modifiers B are highly amorphous homo- or copolymers of propylene. Highly amorphous polypropylenes are to be understood as meaning polypropylenes which have a crystalline PP fraction of not more than 10% by weight, preferably not more than 7% by weight, with an enthalpy of fusion of not more than 40 J/g, preferably not more than 30 J/g.

The melt flow index of highly amorphous polypropylenes is once again between 0.1 and 100 g/10 min, preferably between 0.5 and 50 g/10 min. As mentioned above, the modifier B may be a homopolymer of propylene or a copolymer of propylene with one or more α-olefins. Suitable comonomers are once again α-olefins having 2 to 10 C atoms, such as, for example, ethylene, butene, pentene, hexene or decene.

Ethylene is preferably used as a comonomer. The amount of propylene in the copolymers is at least 80 mol %, preferably at least 90 mol %.

The modifier B is added in an amount of from 5 to 30% by weight to the base polymer to be modified.

The preparation of the polypropylenes according to the invention, having a reduced tendency to white fracture, is carried out, for example, by simple mixing of the corresponding base polymer A with the modifier B in the desired weight ratio in a conventional mixer or header at temperatures between 190° and 300° C. The processing temperature is preferably from 200° to 250° C. The base polymer A and modifier B may be present in powder or granular form. Further processing is then carried out, for example by means of extrusion and conversion into the desired final form, for example into granules, film, injection molded parts or extruded parts.

The polypropylenes according to the invention are distinguished by a substantially reduced tendency to white fracture compared with the prior art, the other mechanical properties being only slightly adversely affected, if at all, or even improved in some cases.

Furthermore, the recyclability of the polypropylenes according to the invention is retained.

The polypropylenes according to the invention are accordingly suitable for the production of films and injection molded and extruded parts by conventional methods.

EXAMPLES

Blends of different base polymers A and different modifiers B were prepared. For this purpose, the corresponding powders or granules were mixed in the desired weight ratio and the mixture was melted in a COLLIN twin-screw extruder having a screw diameter of 25 mm at from 200° to 240° C. and then extruded at a rate of 4 kg/h through 2 circular dies to give extrudates of 3 mm each. The residence time in the extruder was about 20 s. The extrudate was granulated after solidification in a water bath.

The starting materials used were, as base polymer A,
 a) Daplen KS 101, a PP homopolymer from PCD Polymers,
 b) Daplen KSC 1012, a heterophase EP copolymer from PCD Polymers,
 c) Daplen KSR 4525, a heterophase EP copolymer having high impact strength from PCD Polymere and
 d) Daplen KF C 2208, a homogeneous EP random copolymer and, as modifier B,
 a) ELPP homopolymer, prepared according to Example 1 in EP-A-0 632 062 and degraded by the procedure described below.
 b) ELPP copolymer containing ethylene, prepared according to Example 1 in EP-A-0 632 062, in point b—polymerization—a mixture of 7.2 kg of propene and 0.09 kg of ethylene being used instead of 7.3 kg of propens and an amount of 0.09 kg/h of ethylene being subsequently metered in during the entire polymerization time. Once again, degradation was carried out according to the description below.
 c) As comparative substance: REXFLEX FP-D 400, an experimental product in the course of commercialization, from Rexene Corp., Odessa, Tex. 779760, U.S.A.

The degradation of the two ELPP products was carried out as follows:

The ELPP obtained according to Example I in EP-A-0 632 062 was milled to a particle size of less than 3 mm in a breaker mill, after cooling to below 0° C. Thereafter, 0.1 (in the case of ELPP homopolymers) or 0.2 (in the case of ELPP copolymers) % by weight of bis((1,1-dimethylethyl) peroxyisopropyl)benzene (Perkadox 14 Sfl, from AKZO NOBEL), based on the amount of polymer, was mixed in and the mixture was melted in a COLLIN twin-screw extruder having a screw diameter of 25 mm at 190°–200° C. and extruded at a rate of 2 kg/h through two circular dies to give extrudates of 3 mm each. The residence time in the extruder was about 30 sec. After solidification, the extrudate was granulated in a water bath. The ELPP was degraded to an MFI of 6 (ELPP homopolymer) or 12 (ELPP copolymer) g/10 min.

The important properties, such as MFI, enthalpy of fusion (Hm), $C_2$ content ($C_2$) and modulus of elasticity of the modifiers used are summarized in Table 1.

TABLE 1

| Material | MFI (g/10 min) | Hm (DSC) (J/g) | $C_2$ (mol %) | Modulus of elasticity (MPa) |
|---|---|---|---|---|
| ELPP homopolymer | 6 | 19 | 0 | 17 |
| ELPP copolymer | 12 | 10 | 6 | 7 |
| REXFLEX FP-D 400 | 18 | 23 | 3.6 | 27 |

The melt flow index was determined according to ISO 1133/DIN 53735, at 230° C./2.16 kg. The crystallinity of the modifiers was determined by means of DSC according to ISO 3146, the 2nd heating process being evaluated in a cycle between 10° C. and 190° C. with heating and cooling rates of 10 K/min. The $C_2$ content was determined by means of IR spectroscopy.

The mechanical properties of the systems were determined using test specimens produced by injection molding (according to DIN 16774 (1988)) at a melt temperature of 250° C. and a mold temperature of 30° C., according to the following methods:

*Tensile test on injection molded dumbbells F3/3 according to DIN 53455 (1981) for elongation at break and tensile stress at break, or DIN 53457 (1981) for the tensile modulus of elasticity

*Room temperature impact strength at +23° C. (IS +23° C.) in the tensile impact resistance test according to ISO 8256 (1990) using a standard bar B (80×10×4 mm) with double V notch (method A)

Low-temperature impact strength at −20° C. (IS −20° C.) in the impact resistance test according to ISO 179 (1 eU) using the unnotched standard bar B Shore hardness (method D) according to ISO 868 (1978) using injection molded test specimens The tendency to white fracture of the polypropylenes according to the invention was determined by the method according to F. Altendorfer and M. P. Frank, Kunststoffe 70 (1980), pages 98–101. In this context, a tensile test was carried out on a modified dumbbell F 3/3 according to DIN 53455/1981 with a round notch in the middle, for reduction of the width from 10 to 8 mm.

The parameters for this were:

Test speed: 5 mm/min

Clamped length: 110 mm

Measured length: 50 mm

Test temperature: 23° C.

With the aid of the optical sensor described there, an opacity/elongation diagram was recorded simultaneously with a force/elongation diagram, and the elongation at which white fracture occurs was determined from the said opacity/elongation diagram with the aid of a tangent method. The associated white fracture energy is also determined. The mean value of 5 individual measurements is determined in each case.

The results of these tests and the exact composition of the blends are summarized in Tables 2 to 4.

TABLE 2

| Types | Tensile test Modulus of elasticity/MPa | Tensile strength/ MPa | Elongation at break/ % | White fracture yield point % |
|---|---|---|---|---|
| KS 101 | 1150 | 33.5 | 778 | 3.18 |
| KS 101 + 10% ELPP-Homo | 1110 | 19.3 | 310 | 5.68 |
| KS 101 + 25% ELPP-Homo | 742 | 17.6 | 313 | no wf |

| Types | MFI g/10 min | IS +23° C. kJ/m² | IS −20° C. kJ/m² | Shore D degrees |
|---|---|---|---|---|
| KS 101 | 8 | 57.0 | 16.2 | 66 |
| KS 101 + 10% ELPP-Homo | 8 | 75.0 | 15.0 | 63 |
| KS 101 + 25% ELPP-Homo | 7 | 109.8 | 14.0 | 61 |

TABLE 3

| Types | Tensile test Modulus of elasticity/MPa | Tensile strength/ MPa | Elongation at break/ % | White fracture yield point % |
|---|---|---|---|---|
| KFC 2208 | 668 | 29.0 | 530 | 8.62 |
| KFC 2208 + 10% ELPP-Homo | 631 | 26.2 | 633 | no wf |
| KFC 2208 + 25% ELPP-Homo | 351 | 22.3 | 640 | 15.80 |
| KFC 2208 + 25% ELPP-Copo | 304 | 21.9 | 693 | no wf |

| Types | MFI g/10 min | IS +23° C. kJ/m² | IS −20° C. kJ/m² | Shore D degrees |
|---|---|---|---|---|
| KFC 2208 | 8 | 123.0 | 44.0 | 58 |
| KFC 2208 + 10% ELPP-Homo | 8 | 140.8 | 35.6 | 55 |
| KFC 2208 + 25% ELPP-Homo | 8 | 183.0 | 17.9 | 51 |
| KFC 2208 + 25% ELPP-Copo | 8 | 195.0 | 24.2 | 49 |

TABLE 4

| Types | Tensile test Modulus of elasticity/MPa | Tensile strength/ MPa | Elongation at break/ % | White fracture yield point % |
|---|---|---|---|---|
| KSC 1012 | 1233 | 12.8 | 134 | 2.45 |
| KSC 1012 + 10% ELPP-Homo | 1178 | 19.9 | 230 | 3.57 |
| KSC 1012 + 25% ELPP-Homo | 776 | 18.0 | 647 | no wf |
| KSC 1012 + 25% REFLEX | 787 | 16.3 | 526 | 12.14 |
| KSR 4525 | 960 | 7.5 | 333 | 5.09 |
| KSR 4525 + 10% ELPP-Homo | 791 | 16.5 | 558 | 6.86 |
| KSR 4525 + 25% ELPP-Homo | 521 | 18.5 | 697 | 12.14 |
| KSR 4525 + 25% REFLEX | 534 | 18.2 | 646 | 32.31 |

| Types | MFI g/10 min | IS +23° C. kJ/m² | IS −20° C. kJ/m² | Shore D degrees |
|---|---|---|---|---|
| KSC 1012 | 8 | 51.3 | 75.7 | 61 |
| KSC 1012 + 10% ELPP-Homo | 8 | 71.3 | 68.5 | 59 |
| KSC 1012 + 25% ELPP-Homo | 7 | 102.0 | 54.6 | 57 |
| KSC 1012 + 25% REFLEX | 8 | 250 | 14.4 | 41 |
| KSR 4525 | 7 | 88.0 | 100.4 | 54 |
| KSR 4525 + 10% ELPP-Homo | 7 | 89.5 | 128.9 | 54 |
| KSR 4525 + 25% ELPP-Homo | 7 | 115.6 | 91.6 | 50 |
| KSR 4525 + 25% REFLEX | 9 | 104 | 108.5 | 50 |

No wf = No white fracture can be detected by the method of measurement mentioned in the description

What we claim is:

1. A polypropylene having a reduced tendency to white fracture, which contains
   A) from 70 to 95% by weight of a highly isostactic polypropylene having an isostactic index of more than 90 and a melt flow index between 0.1 and 100 g/10 min, wherein the polypropylene is a homopolymer of propylene or a copolymer of propylene with one or more α-olefins, having a propylene content of at least 50 mol %, and
   B) from 5 to 30% by weight of a highly amorphous polypropylene having a crystalline polypropylene fraction of up to 10% by weight with an enthalpy of fusion of not more than 40 J/g and a melt flow index between 0.1 and 100 g/10 min, wherein the polypropylene is a homopolymer of propylene or a copolymer of propylene with one or more α-olefins, having a propylene content of at least 80 mol %.

2. The polypropylene as claimed in claim 1, wherein a homopolymer of propylene or a copolymer of propylene with one or more α-olefins, having a propylene content of at least 70 mol %, is used as the highly isotactic polymer, the isotactic index of the polymers being more than 95 and the melt flow index being between 0.5 and 50 g/10 min.

3. The polypropylene as claimed in claim 1, wherein random copolymers or heterophase copolymers with ethylene and/or an α-olefin having 4 to 10 C atoms are used as the copolymer of propylene.

4. The polypropylene as claimed in claim 1, wherein random or heterophase copolymers with ethylene are used as the copolymers of propylene.

5. The polypropylene as claimed in claim 1, wherein a homopolymer of propylene or a copolymer of propylene with one or more α-olefins, having a propylene content of at least 85 mol %, is used as the highly amorphous polymer, the polymers having a crystalline polypropylene fraction of not more than 7% by weight with an enthalpy of fusion of not more than 30 J/g and a melt flow index of from 0.5 to 50 g/10 min.

6. A method for the production of injection molded or extruded parts, which comprises injection molding or extruding the polypropylene as claimed in claim 1.

* * * * *